Patented June 13, 1950

2,511,296

UNITED STATES PATENT OFFICE 2,511,296

COPOLYMERS OF SILICON DERIVATIVES

John B. Rust, Montclair, N. J., assignor, by direct and mesne assignments, of one-half to Montclair Research Corporation, a corporation of New Jersey, and one-half to Ellis-Foster Company, a corporation of New Jersey No Drawing. Application August 20, 1945, Serial No. 611,685

22 Claims. (Cl. 260—46.5)

This invention relates to copolymers of silicon derivatives and to methods of making the same.

It is known that esters of silicic acid may be hydrolyzed to form first a coherent, glassy mass, and then a silica sand on further removal of the alkoxy groups and dehydration. It is also known that alkyl silicon hydroxides will polymerize on dehydration to produce hard resins if the alkyl radical ratio to silicon is sufficiently low.

Among the objects of the present invention is the production of copolymerization products of organic substituted silicon derivatives or organic substituted silanes with hydrolyzed silicochloroform or related derivatives.

Further objects include the production of copolymers of alkyl silicon derivatives or alkyl silane derivatives with a polymeric derivative having the nature or structure of silicoformic acid, that is, a polymer containing hydrogen bonded directly to silicon.

Further objects include the production of homogeneous composite resins composed of the copolymerization products of silicoformic acid with organic silicon derivatives or silane derivatives, particularly alkyl slicon and silane derivatives.

Still further objects include the production of such composite resins by the utilization of relatively inexpensive materials such as silicochloroform or esters derivable therefrom, such as trialkoxy silane, said products having high heat stability, good color and chemical resistance.

Still further objects include the production of hard, resinous materials from an organo oxy silane such as an alkoxy silane or silicochloroform and a non-resinifying alkyl silicon or alkyl silane hydroxide.

Still further objects and advantages of the present invention will appear from the more detailed description set forth below, it being understood that this more detailed description is given by way of illustration and explanation only and not by way of limitation, since various changes therein may be made by those skilled in the art without departing from the scope and spirit of the present invention.

In accordance with the present invention, copolymerization products are produced from a silicohaloform derivative with an organic silicon compound differing from said silicohaloform derivative. The production of such copolymerization products enables the utilization of relatively inexpensive materials such as silicochloroform, in the production of stable, coherent, resinous products having high heat stability, good color, and chemical resistance. The silicohaloform derivative may be represented by the formula $SiHR_3$, where R is halogen or OR' and R' is an organic group, with an organic silicon compound differing from said silicohaloform derivative, the copolymerized organic silicon compound being desirably selected from organic silicon hydroxides, organic silicon halides, organo-substituted alkoxy silanes, etc. Generally it may be said that the invention comprises copolymerization products produced from a silicohaloform or an alkoxy silane cohydrolyzed with an organic substituted silicon or silane derivative so that copolymerization products may be readily produced of the character set forth above. Thus the reaction products are produced from a silicohaloform derivative selected from the group consisting of alkoxy silanes and silicohaloforms with an organic substituted derivative selected from the group consisting of organic silicon hydroxides, organic silicon halides and the like, or with organic substituted silane derivatives selected from the group consisting of alkoxy alkyl silanes and organic silane hydroxides. These copolymerizing compounds of organic silicon or silane derivatives as set forth above, bay carry substituted groups such as alkyl, alphyl, aryl, alkynyl, alkenyl, aralkyl, alkanyl, olefinyl, non-aromatic carbocyclic groups and the like, and one or more of such groups may be present as where all of the substituted groups are the same, or different groups are present to produce mixed derivatives. Such substituent groups are illustrated by methyl, ethyl, propyl, butyl, amyl, hexyl, heptyl, octyl, vinyl, allyl, butenyl, cyclohexyl, benzyl, phenyl, tolyl, xenyl, chlorphenyl, styryl, radicals from acetylene, methyl acetylene, propyl acetylene, phenyl acetylene, and the like. Such reactants may be monosilicon derivatives or polysilicon derivatives such as are derivable from disilicon hexachloride, trisilicon octachloride and the like, or chlorosilane derivatives such as disilane tetrachloride, trisilane pentachloride, and the like.

These silane and silicon derivatives in preferred instances may be represented as follows: $RSiCl_3$, $R_2SiCl_2$, $R_3SiCl$, $RR'iSCl_2$, $RR'R''SiCl$, $RSiHCl_2$, $R_2SiHCl$, $RR'SiHCl$, and the like, where the various substituent groups represented by R, R', R'' may be any of the organo groups indicated above. For purposes of illustration, the chlorine derivatives are used but in lieu of chlorine in the formulas set forth above, other halogens or alkoxy groups may be present.

The formulations as illustrated above for reacting components of this invention, are not offered by way of limitation but only as a possible explanation, since the invention may be interpolated in view of these suggested formulations; but other theoretical considerations may also come into play.

Various methods and materials may be utilized to produce the copolymerization products of the present invention, all leading however to substantially the same results subject to special variations under particular conditions. Thus the selected reacting materials are copolymerized, for example, by cohydrolysis and codehydration. Various examples will be given below to illustrate such methods without limitation to the scope of the invention other than as defined in the appended claims. The proportions of reactants may vary but there should be present a sufficient amount of the silicohaloform derivative to influence the characteristics of the ultimate copolymerized material to the desired extent. The amount of such haloform derivative present in the copolymer will under some circumstances determine the hardness or viscosity of the final copolymerization product. Thus, with relatively large amounts of silicochloroform in the copolymer, the products are hard, brittle, resinous materials. Decreasing the amount of the silicochloroform or silicochloroform derivative results in softer products which in some cases are liquids.

Thus the nature of the product obtained will be determined by the type of substituent organic group such as alkyl group in the compounds undergoing treatment, by the number of such substituent organic groups, and the proportion of copolymerizing compound used with the silicohaloform specifically silicochloroform; proportions of particular compounds may thus be chosen to control the type of product desired.

In its generic aspect, the silicohaloform employed may contain substituent organo groups as pointed out above, specifically the alkyl derivatives like the alkyl silicochloroforms, such as methyl, ethyl, propyl, butyl, etc., silicochloroforms. Considering such organo substituted silicohaloform derivatives, these may be formulated as

$$R''_{3-x}SiHR_x$$

where R is halogen or OR' and R' is an organic group as set forth hereinabove, and $x$ has the numerical value of 1 to 3, and R'' is an organic group as set forth but more particularly is a lower alkyl group. Such silicohaloforms may thus be utilized for the preparation of copolymers as explained above. Particularly copolymers may be produced from alkyl silicon derivatives such as the alkyl silicon hydroxides, the alkyl silicon halides and the alkyl alkoxy silanes with the alkyl silicochloroform derivatives, cohydrolysis products may be formed, and dehydrated, as exemplified hereinafter. In the alkyl derivatives set forth above, mixed alkyl groups may be present either in one of the stated copolymerizing constituents or both, or mixtures of different alkylated derivatives may be used; and this is true of other organo-substituted derivatives as well as of the alkyl substituted compounds.

In the following illustrative examples, all parts are given by weight.

*Example 1.*—Two parts of silicochloroform and three parts of methyl silicon trichloride were added to 15 parts of diethyl ether. The ether solution was then poured on ice. The hydrolyzed product remained in the ether layer and the mixture was separated from the water and dried over sodium sulfate. A sample of the product was poured on a glass plate. After evaporation of the ether a clear film was obtained which hardened in a few minutes.

*Example 2.*—One part of silicochloroform and one part of di-n-butyl silicon dichloride were placed in 10 parts of ether. The resulting mixture was hydrolyzed by pouring it on ice. The ether layer was separated and dried over Na2SO4. A film, poured on a glass plate, was heated to 170° C. for 4 hours. A clear, hard film was thus obtained.

*Example 3.*—One part each of silicochloroform, methyl silicon-trichloride and di-n-butyl silicon dichloride were placed on 15 parts of ether. The mixture was hydrolyzed by pouring on ice. It was then separated and dried over Na2SO4. A film, poured on a glass plate, was heated for 3 hours at 150° C. A clear, hard film was obtained.

*Example 4.*—One part of a crude mixture obtained in the preparation of silicochloroform (essentially 80% silicochloroform and 20% silicon tetrachloride) and two parts of di-n-butyl silicon dichloride were placed in 10 parts of ether. The mixture was hydrolyzed by pouring on ice. It was separated from the water layer and dried over Na2SO4. A film was poured on a glass plate and left at 50° C. for 16 hours. A clear, non-tacky, soft film was obtained.

*Example 5.*—One part of silicochloroform and one part of phenyl silicon trichloride were placed in 10 parts of ether. The mixture was hydrolyzed on ice, separated from the water and dried over Na2SO4. A film, poured on a glass plate, was heated at 140° C. for 2 hours. A clear, hard film was obtained.

*Example 6.*—One part each of silicochloroform, phenyl silicon trichloride and di-n-butyl silicon dichloride were mixed and added to 15 cc. of ether. The mixture was hydrolyzed by pouring on ice. It was separated from the water layer and dried over Na2SO4. A film, poured on a glass plate, was heated at 140° C. for 2 hours. A clear, hard film was obtained.

*Example 7.*—One part of mono-n-butyl silicochloroform and one part of silicochloroform were added to 10 parts of ether. The mixture was poured on ice and the ether layer was separated and dried over Na2SO4. A portion of the product was poured on a glass plate. The plate was heated for two hours at 120° C. A clear, hard film was obtained.

*Example 8.*—One part of mono-n-butyl silicochloroform, one part of di-n-butyl silicon dichloride and two parts of ethyl silicon trichloride were added to 10 parts of ether. The mixture was hydrolyzed by pouring on ice and the ether layer was separated and dried over Na2SO4. A sample was poured on a glass plate and the plate was heated for 2 hours at 120° C. A soft, sticky film was obtained. Heating was continued for another hour at 160° C. A clear, hard film was obtained.

*Example 9.*—One part of mono-n-butyl silicochloroform and one part of methyl silicon trichloride were added to 10 parts of ether. The mixture was poured on ice and the ether layer, containing the silicol mixture, was dried over Na2SO4. A sample poured on glass, was heated at 120° C. for 2 hours. A clear, hard film was obtained.

*Example 10.*—Two parts of mono-n-butyl silicochloroform and one part of silicon tetrachloride were added to 10 parts of ether. The mixture was hydrolyzed by pouring on ice. The ether layer was separated and dried over Na2SO4. A portion of the mixture was poured on a glass plate and heated at 160° C. for 2 hours. A clear, hard film was obtained.

*Example 11.*—Three parts of triethylsilicon-monochloride and three parts silicochloroform were mixed with thirty parts of ethyl ether and hydrolyzed by vigorous stirring with 100 parts of crushed ice. After coming to room temperature the ether layer was separated and dried over sodium sulfate until solution was clear. Fifty parts of ethyl acetate were added to the solution and the ether was distilled off, together with twenty parts of the ethyle acetate. From the resulting solution films were poured on glass and baked in the oven for one hour at 150° C. Hard brittle films were formed.

The materials of the present invention may be used for a large number of applications. They may be dissolved in a solvent or composite solvent and used as lacquers, varnishes, impregnating varnishes, insulating varnishes, protective coatings, molding compositions, and the like. For such purposes they may be blended with other components such as natural resins including rosins, copal, shellac, etc., as well as synthetic resins including urea aldehyde, specifically urea formaldehyde, phenol aldehyde, melamine, aniline aldehyde, acetone formaldehyde, alkyd, cumarone-indene, resins, vinyl resins, and polymerized vinyl derivatives, allyl dibasic acid resins, acrylate and methacrylate resins, and with various cellulose derivatives including the ethers and esters, such as nitrocellulose and the organic esters of cellulose such as cellulose acetate, and the like, as well as with drying, semi-drying, and non-drying oils. These utilizations apply to the products whether partially polymerized or completely polymerized depending on the utilization that is to be made of the derivatives. They may be used as lubricating oils, or as additives to hydrocarbon oils for lubricating purposes, and for inclusion with the vegetable oils, particularly the drying oils such as linseed oil and China-wood oil, and the semi-drying oils such as soya bean oil, etc., as well as the non-drying oils including castor oil. With the vegetable or other glyceride oils they may be blended as by cooking. Various combinations of the indicated derivatives set forth above may be utilized for particular purposes.

They may be used in view of their electrical properties, in the production of varnishes or coatings for electrical insulation, as dielectric liquids, etc. They may be employed in the production of laminated products for bonding together two or more sheets of the same or different organic or inorganic materials.

For production of molding compositions, organic or inorganic fillers, may be impregnated with the polymerized or partially polymerized materials and utilized for molding purposes, as for example, in hot pressing operations. Fillers for these purposes may be inorganic materials, such as the various inorganic fillers, mica, clays, asbestos, or the organic fillers including cellulose products, such as wood or wood fibers, cellulose fibers of various types, paper, etc.

As solvents for the products of the present invention to produce solutions for any of the purposes set forth above as in the production of lacquers, varnishes, impregnating compositions, coating compositions, or in the use of solutions of such reaction products for impregnation of fillers for hot pressing operations, etc., or for the production of solutions of such reaction products to preserve them for future use, a variety of solvents may be employed. Such solvents include hydrocarbon solvents, both aliphatic and aromatic such as hexane, benzene, toluene and so forth, ethers such as dimethyl, diethyl, diisopropyl, dibutyl ethers and cyclic ethers such as dioxan or diethers such as diethyl ether or ethylene glycol or mixed ethers, esters such as ethyl, butyl or amyl acetates, propionates, butyrates and the like. Solvents may be added during the reaction itself or at a later stage. When the use of a solvent is desired, it is sometimes advantageous to add the solvent to the reaction mixture before it is poured on ice when hydrolysis is being carried out.

Having thus set forth my invention, I claim:

1. Codehydration products of halogen hydrolysis only of a silicohaloform having the formula $SiHR_3$ where R is halogen, with an organic silicon halide containing organic and halogen radicals only attached to silicon, the organic radicals being monovalent hydrocarbon radicals, the ratio of silicohaloform to organic silicon halide being from 2:1 to 1:3 by weight.

2. Codehydration products as set forth in claim 1 in which the organic group is alkyl.

3. Cohydrolysis products of halogen hydrolysis only of a silicohaloform having the formula $SiHR_3$ where R is halogen, with an organic silicon halide containing organic and halogen radicals only attached to silicon, the organic radicals being monovalent hydrocarbon radicals, the ratio of silicohaloform to organic silicon halide being from 2:1 to 1:3 by weight.

4. Cohydrolysis products as set forth in claim 3 in which the organic group is alkyl.

5. The method of preparing copolymers which comprises cohydrolyzing by water the halogen only of a silicohaloform having the formula $SiHR_3$ where R is halogen, with an organic silicon halide containing organic and halogen radicals only attached to silicon, the organic radicals being monovalent hydrocarbon radicals, the ratio of silicohaloform to organic silicon halide being from 2:1 to 1:3 by weight.

6. The method as set forth in claim 5 in which the organic group is alkyl.

7. The method of preparing copolymers which comprises cohydrolyzing by water the halogen only of a silicohaloform having the formula $SiHR_3$ where R is halogen, with an organic silicon halide containing organic and halogen radicals only attached to silicon, the organic radicals being monovalent hydrocarbon radicals the ratio of silicohaloform to organic silicon halide being from 2:1 to 1:3 by weight and dehydrating the resulting product.

8. The method of preparing copolymers which comprises cohydrolyzing by water the halogen only of a silico-haloform having the formula $SiHR_3$ where R is halogen, with an organic silicon halide containing organic and halogen radicals only attached to silicon, the organic radicals being monovalent hydrocarbon radicals, the ratio of silicohaloform to organic silicon halide being from 2:1 to 1:3 by weight and dehydrating the resulting product and heat hardening the dehydrated product.

9. Codehydration products of halogen hydrolysis only of an inorganic silicon halide having the formula $SiH_rX_s$ where X is halogen, $r$ is an integer of from 0 to 1, $s$ is an integer of from 4 to 3 and $r+s=4$, with an organic silicon halide having the formula $R''_xSiH_yR_z$ where $R''$ is a monovalent hydrocarbon radical, $x$ is an integer of from 1 to 3, $y$ is an integer of from 0 to 1, R is halogen, $z$ is an integer of from 1 to 3, $x+y+z=4$, one of the reactants having an Si—H bond and one of the reactants not having an Si—H bond, and the ratio of the inorganic silicon halide to the organic silicon halide being from 2:1 to 1:3 by weight.

10. Codehydration products as set forth in claim 9 in which R'' is alkyl.

11. The method of preparing copolymers which comprises cohydrolyzing by water the halogen only of an inorganic silicon halide having the formula $SiH_rX_s$ where X is halogen, $r$ is an integer of from 0 to 1, $s$ is an integer of from 4 to 3 and $r+s=4$, with an organic silicon halide having the formula $R''_xSiH_yR_z$ where R'' is a monovalent hydrocarbon radical, $x$ is an integer of from 1 to 3, $y$ is an integer of from 0 to 1, R is halogen, $z$ is an integer of from 1 to 3, $x+y+z=4$, one of the reactants having an Si—H bond and one of the reactants not having an Si—H bond and the ratio of the inorganic silicon halide to the organic silicon halide being from 2:1 to 1:3 by weight.

12. The method as set forth in claim 11 in which R'' is alkyl.

13. Codehydration products of halogen hydrolysis only of silicochloroform and di-n-butyl silicon dichloride in the ratio of 1:1 by weight.

14. Codehydration products of halogen hydrolysis only of silicochloroform and methyl silicon-trichloride and di-n-butyl silicon dichloride, the ratio of reactants being 1:1:1 by weight.

15. Codehydration products of halogen hydrolysis only of silicochloroform, di-n-butyl silicon dichloride, and silicon tetrachloride, the ratio of reactants being .8:2.0:0.2 by weight.

16. The method of preparing copolymers which comprises cohydrolyzing by water the halogen only of silicochloroform and di-n-butyl silicon dichloride in the ratio of 1:1 by weight and dehydrating the resulting product.

17. The method of preparing copolymers which comprises cohydrolyzing by water the halogen only of silicochloroform and methyl silicon-trichloride and di-n-butyl silicon dichloride, the ratio of reactants being 1:1:1 by weight.

18. The method of preparing copolymers which comprises cohydrolyzing by water the halogen only of silicochloroform, di-n-butyl silicon dichloride, and silicon tetrachloride, the ratio of reactants being .8:2.0:0.2 by weight.

19. Codehydration products as set forth in claim 9 in which the inorganic silane is silicochloroform and the organic silicon halide is phenyl silicon trichloride.

20. Codehydration products as set forth in claim 9 in which the inorganic silane is silicochloroform and the organic silicon halide is phenyl silicon trichloride together with di-n-butyl silicon dichloride.

21. The method of claim 11 in which the inorganic silane is silicochloroform and the organic silicon halide is phenyl silicon trichloride.

22. The method of claim 11 in which the inorganic silane is silicochloroform and the organic silicon halide is phenyl silicon trichloride together with di-n-butyl silicon dichloride.

JOHN B. RUST.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,306,222 | Patnode | Dec. 22, 1942 |
| 2,371,050 | Hyde | Mar. 6, 1945 |
| 2,377,689 | Hyde | June 5, 1945 |
| 2,380,995 | Rochow | Aug. 7, 1945 |
| 2,381,000 | Patnode | Aug. 7, 1945 |
| 2,381,002 | Patnode | Aug. 7, 1945 |
| 2,381,138 | Patnode | Aug. 7, 1945 |
| 2,386,259 | Norton | Oct. 9, 1945 |

OTHER REFERENCES

Richter-Speilmann; Organic Chemistry, 2nd ed., volume 1, received 1925, page. 284.

Stock: Hydrides of Boron and Silicon, Cornell U. Press, 1943, pp. 27, 28, and 13.

Stock et al.: Berichte Deut. Chem. Gesel., vol. 56, 1923 pp. 986, 987, 994 to 997.